United States Patent [19]

Lindsay

[11] Patent Number: 5,441,017
[45] Date of Patent: Aug. 15, 1995

[54] PET LEASH WITH INTEGRAL WASTE BAG DISPENSER

[76] Inventor: Joseph M. Lindsay, 415 Retaheim Way, La Jolla, Calif. 92037

[21] Appl. No.: 163,516
[22] Filed: Dec. 9, 1993
[51] Int. Cl.⁶ ............................................. A01K 27/00
[52] U.S. Cl. ................................ 119/795; 119/161; 119/858
[58] Field of Search ............... 119/792, 793, 795, 161, 119/95, 858; 242/55.2, 55.53; 294/1.3, 1.4, 1.5; 221/310, 25, 26; 225/106

[56] References Cited

U.S. PATENT DOCUMENTS

| | | | |
|---|---|---|---|
| 3,260,237 | 7/1966 | Atterbury | 119/161 |
| 3,291,299 | 12/1966 | Minnotte, Jr. | 225/106 |
| 3,949,947 | 4/1976 | Youngquist et al. | 242/55.53 |
| 4,226,456 | 10/1980 | Barnett | 294/1.3 |
| 4,677,697 | 7/1987 | Hayes | 294/1.3 |
| 4,936,452 | 6/1990 | Pauley | 242/55.53 |
| 5,167,377 | 12/1992 | Chalmers | 119/174 X |

FOREIGN PATENT DOCUMENTS

| | | | |
|---|---|---|---|
| 2055507 | 5/1993 | Canada | 119/161 |
| 720914 | 2/1932 | France | 225/106 |
| 2504354 | 10/1982 | France | 119/95 |
| 2904289 | 8/1980 | Germany | 294/1.3 |
| 672873 | 1/1990 | Switzerland | 294/1.3 |

Primary Examiner—Todd E. Manahan
Attorney, Agent, or Firm—Ralph S. Branscomb

[57] ABSTRACT

An accessory for use with pets, particularly dogs, has a leash of conventional construction to which is mounted to a preferably removable disposable bag dispenser which houses a roll of disposable bags dispensed through a slit in the side of the housing as needed for use in cleaning the pet's waste. In the preferred embodiment a scoop is built integrally with the end of the dispenser housing.

13 Claims, 1 Drawing Sheet

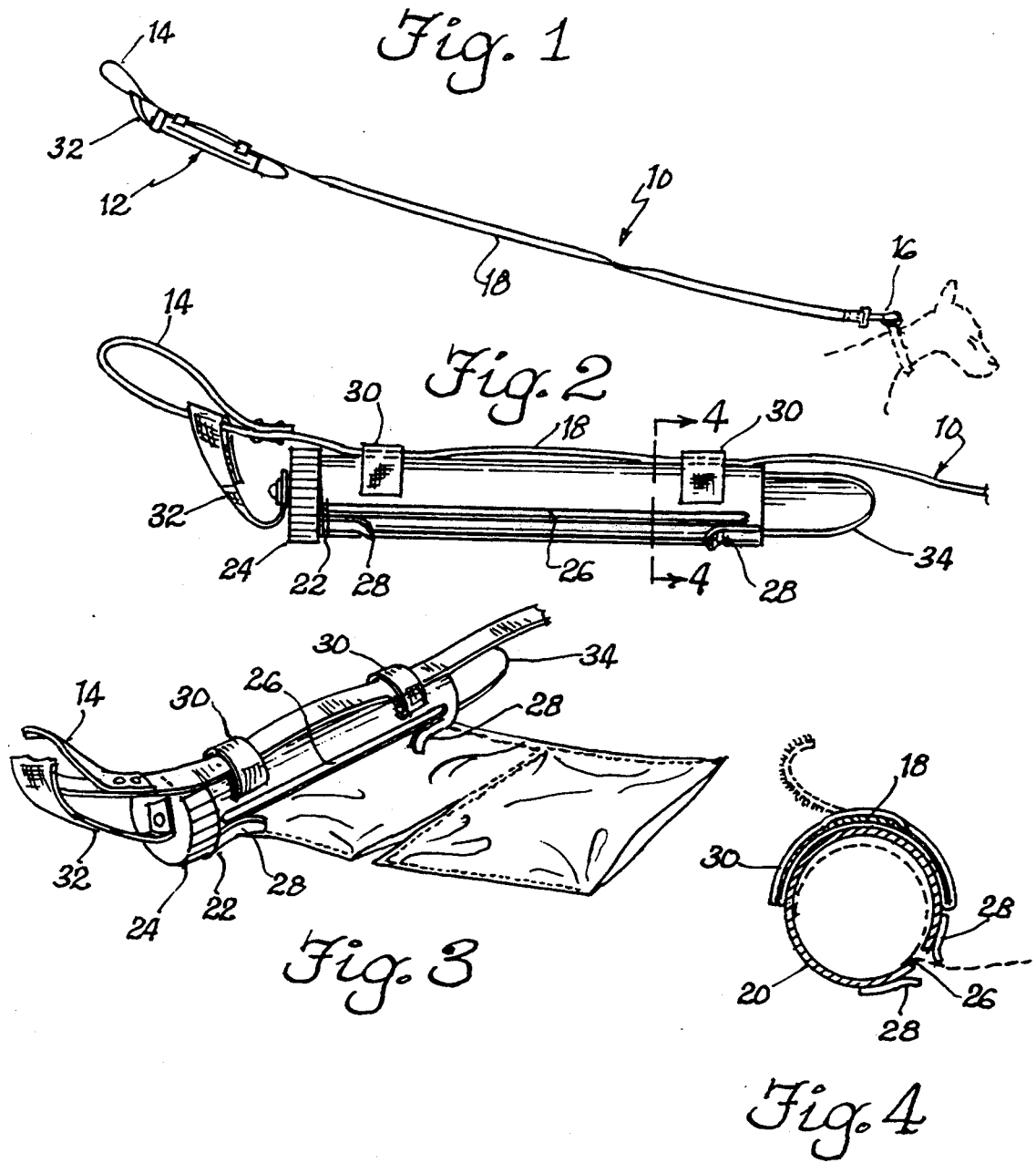

PET LEASH WITH INTEGRAL WASTE BAG DISPENSER

BACKGROUND OF THE INVENTION

As the population has increased, particularly in urban areas, and as urbanites have increased their affinity for pets, the number of "pooper scooper" type devices that have been designed or imagined has exploded. There must be thousands of designs for various gadgets and techniques for cleaning up a dog's droppings in the most convenient fashion. This burst of inventiveness has no doubt been spurred in large part by city ordinances which impose fines on pet owners who do not clean up after their dogs. Particularly in New York city, a pet owner who does not want to be subject to a heavy fine must be very meticulous about cleaning up after his dog on a real-time basis, as opposed to resolving to return later, which would earn him a ticket.

A typical example of this type of scooper comprises a cane or stick with a dust pan-type shovel of some kind at the lower end and a handle at the other end with a trigger or actuator mechanism which somehow assists in scooping the droppings into the dust pan portion. Various mechanisms for encapsulating the droppings in bags while it is being scooped or afterwards have been concocted.

No doubt a lot of these are good ideas, although they tend to run into overly complex machinations, being too elaborate for a one-purpose device which accomplishes a purpose which is fairly easily done by hand in the alternative. All "pooper scooper" inventors should remember that the device they are designing replaces the simple kitchen bag or two in one's pocket and collecting the droppings by hand. Although this may not be as pleasant as executing the same function at the end of a stick, it is probably least as efficient and does not require leaving an unsanitary contraption around the house between dog walkings.

It is believed that any dog dropping contraption or "pooper scooper" must be simple and inexpensive, not taking up much room when it is not in use and not complicated to the extent that the dog owner is expected to make a minor hobby out of his new "pooper scooper" device.

SUMMARY OF THE INVENTION

The instant invention fulfills this criteria for first rate "pooper scooper" design, inasmuch as it is very inexpensive to produce and to retail, it is compact, lightweight, and is more convenient and dependable than stuffing a few bags in one's pocket without being much more involved.

The accessory of the instant invention is a combination dog leash and a specially designed dispenser for the common household plastic bags that are sold on rolls by a dozen different manufacturers in a grocery stores. These plastic film bags, called "sandwich bags" or "storage bags" or "refrigerator bags" are the inexpensive type, costing several cents per bag, that are universally available in several different sizes at any supermarket. The instant invention in its preferred form uses the kitchen bag which is one size up from the sandwich bag, plain, without the zipper-top construction.

The dispenser for these bags has a cylindrical body into which is inserted a full roll of bags. A slit on the side of the container dispenses the bags one at a time as needed. The container also has a mounting which connects it to a dog leash so that they are at the hand of the dog owner at all times during a walk. It eliminates the thinking operation from the dog walking process inasmuch as the bags automatically accompany the leash and the leash automatically accompanies the dog.

Far from being a burdensome encumbrance on the walking activity, the dispenser may serve further functions in addition to dispensing, such as providing a firm, fairly wide gripping surface, which is important if the dog owner is suffering from arthritis. It also can be used as a short baton to fend off other dogs. When used for its primary purpose, it has a scoop defined on one end to assist in the litter retrieval process.

BRIEF DESCRIPTION OF THE DRAWINGS

FIG. 1 is a somewhat diagrammatic side elevation view of a dog being walked, illustrating the leash with the dispenser in place;

FIG. 2 is a side elevation view of the accessory showing the manner of mounting the dispenser container to the leash;

FIG. 3 is a perspective view of the upper portion of the leash with the dispenser mounted thereon illustrating the manner in which bags are pulled through the slit in the side of the dispenser for use; and, FIG. 4 is a transverse section taken through the dispenser illustrating the Velcro ® straps as they relate to the dispenser container and the bag roll as it relates to the container and the dispensing slit.

DETAILED DESCRIPTION OF THE PREFERRED EMBODIMENT

As shown in FIG. 1, the invention comprises a leash 10 with a dispenser 12 coupled therewith to produce an accessory which almost infallibly couples the act of walking a dog with the convenience of having disposable baggies present to collect the litter.

The leash 10 is of standard leash construction, having a handgrip 14 at the "upper" end, and a collar coupling 16 at the other end, with these two parts being connected by a leash line 18. The collar connector 16 should swivel and the handgrip 14 should be a loop to accommodate connection by the preferred embodiment of the dispenser. The line can be any material strong enough to do the job, such as the nylon strap material currently en vogue in the leash business.

The container 12 is preferably of cylindrical construction with plastic being the material of choice in the preferred embodiment. However, the dispenser body can be other than cylindrical, and can be made of aluminum or another metal, rubber, or even wood or any other material whatsoever, being constrained only by the design criteria of being reasonably lightweight and of size on the order of that of a roll of kitchen bags, both in length and diameter so that an entire bag can be contained in the dispenser right as it comes off the shelf. Alternatively a roll specially designed for this purpose be made by one or more bag manufacturers. Such a specially designed roll could eliminate or reduce in size the cylindrical cardboard core that comes with disposable plastic kitchen bags, and provide a reduced number of bags, thereby reducing the diameter of the dispenser to half or less of the diameter shown in the drawings. The convenience of using rolls straight off-the-shelf from a grocery store would be weighed against the advantage of a decrease in diameter and weight of a custom design.

The roll of bags is inserted into the dispenser casing 20 through one end 22, which is covered by an endcap 24, snapped or screwed in place to secure the bags. When the new roll is inserted into the casing, the leading edge must be slipped out through the dispensing slit 26 as shown in FIG. 3. In the preferred embodiment, there are two resilient tabs 28 at either end of the housing which depress down to bias against the side wall of the casing 20 to provide a clamping action, so that the bag can be pulled or pushed beneath the tabs and held in place as shown in FIG. 3. This enables the user to pull out the bags to the extent shown in FIG. 3, use the first bag to cover his hand, and then use the second bag to contain both the animal's droppings and the first bag. The spring clips keep the bag from slipping back into the container and provide drag to enable the user to tear the next bag from the roll.

A number of connecting techniques can be used to connect the dispenser to the leash. The preferred embodiment in the illustrations has a pair of mounting straps 30 which are Velcro®—(hook-and-loop fastener) covered. The straps are long enough to pass over the line portion of the leash and back onto themselves as shown in FIGS. 2 through 4. Other clips or clamps could be used instead or the dispenser could be non-removable from the leash guaranteeing that the bags would always accompany the dog. In the event that the dispenser is flexible, such as being made out of a suitable nylon cloth or the like, it is likely that the dispenser would be sewn integrally with the line portion of the leash, which would be a nylon strap. The use of a flexible dispenser would have its advantages and disadvantages, the advantages being those advantages inherent in all flexible articles over their rigid counterparts, and the disadvantage being that it would possibly not dispense quite as easily and would not provide as good a handle as a rigid cylinder. To keep the dispenser from sliding down the leash, an elongated restraint 32 which is similar to the straps is mounted to the removable endcap and loops through the loop 14 of the leash handgrip.

At one end of the dispenser body, shown as being the non-removable end in the drawings, a scoop 34 may be mounted. The scoop is used for obvious maneuverings for attempting to get animal droppings into a bag. It could be put on the removable endcap as well, which would make it washable independently of the rest of the dispenser, but would also have the drawback of causing the access opening of the container to become dirtied when the bag roll is replaced.

Although it is intended that the leash portion of the invention together with the dispenser be used as a unit, it is conceivable that since the container is removable from the leash there is no reason it could not be used for other purposes as well. Also, it could be mounted on the belt of the dog owner instead of on the leash and have the same effect, although it would obviously lack the advantage of ensuring that the bag dispenser accompanied the dog on all walks.

Thus although subject to wide variation of construction relating to the exact shape and size of the dispenser and the material from which it is made, and the mounting means, whether be straps, hooks, or clips or anything else that attaches to the leash, or whether the canister of the dispenser be flexible or rigid, all of these permutations still have in common the simplicity of a single unit encompassing both a leash and a bag dispenser, falling in level of complexity somewhere between the typical "pooper scooper" and the bag-in-the-pocket, and cost-wise being very close to the bag-in-the-pocket. The device should be an appreciated addition to the line of "pooper scooper" devices that are on the market and those that were perhaps not so lucky to find market but nonetheless have been conceived by inventors.

It is hereby claimed:

1. A pet accessory for restraining pets and assisting in removing the pet droppings, comprising:
    (a) a leash having:
        (i) an elongated leash line;
        (ii) a handgrip defined at one end of said leash line; and,
        (iii) collar attachment means at the other end of said leash line to releasably engage a pet collar; and,
    (b) a disposable bag dispenser comprising:
        (i) an elongated container for holding a plurality of disposable bags in a dispensable order;
        (ii) an access opening in said container for providing access to said bags from externally of said container for dispensing same; and,
        (iii) mounting means mounting said dispenser to said leash such that the exterior of said compartment defines said handgrip, whereby a person walking a pet on said leash has readily and repeatedly available litter disposal bags to facilitate litter removal.

2. Structure according to claim 1 wherein said mounting means removably mounts said dispenser on said leash to permit use of said leash and said dispenser independently from one another.

3. Structure according to claim 1 wherein said disposable bags are provided as a continuous chain of connected but separable bags rolled into an elongated roll, said container is dimensioned to contain said roll, and said access opening comprises a slit longitudinally extended and defined in said container of dimension in the long direction sufficient to permit the full-width passage of one of said bags therethrough.

4. Structure according to claim 1 wherein said container is cylindrical and has at least one removable endcap to permit bag replenishment.

5. Structure according to claim 4 wherein said endcap has a resilient flexible restraint line engaged between said endcap and said leash independently of the rest of said container.

6. Structure according to claim 5 wherein said container defines a scoop projecting from one end thereof to assist in removing pet droppings.

7. Structure according to claim 1 wherein said container is made substantially of cloth and flexible to flex at least partially with said leash.

8. A pet accessory for restraining pets and assisting in removing the pet droppings, comprising:
    (a) a leash having:
        (i) an elongated leash line;
        (ii) a handgrip defined at one end of said leash line; and,
        (iii) collar attachment means at the other end of said leash line to releasably engage a pet collar; and,
    (b) a disposable bag dispenser comprising:
        (i) a container for holding a plurality of disposable bags in a dispensable order;

(ii) an access opening in said container for providing access to said bags from externally of said container for dispensing same; and, (iii) mounting means mounting said dispenser to said leash whereby a person walking a pet on said leash has readily and repeatedly available litter disposal bags to facilitate litter removal; and, (c) said disposable bags being provided as a continuous chain of connected but separable bags rolled into an elongated roll, said container being dimensioned to contain said roll, and said access opening comprising slit longitudinally extended and defined in said container of dimension in the long direction sufficient to permit the full-width passage of one of said bags therethrough; and, (d) a pair of clips adjacent the end portions of said slit to capture the edges of a bag partially extended from said container and hold same ready for withdrawal to prevent re-entry of said bag back into said container.

9. Structure according to claim 8 wherein said clips are resilient, inwardly-directed spring tabs biased against said container and yielding to permit the drawing of a dispensable bag under the respective clips to positively engage same.

10. A continuous-roll bag dispenser for a disposable bag provided in a sequential roll wherein said roll has certain width and length dimensions comprising:

(a) a cylinder dimensioned to accommodate said certain length and width dimensions of said roll to contain same;

(b) at least one end of said cylinder being removable to permit bag roll replacement;

(c) a longitudinal dispensing slit defined in said container of length adequate to permit passage of a full width disposable bag therethrough; and, (d) at least one mounting strap mounted on said container and having means to engage a line to enable the attachment of said container thereto; and, (e) a pair of resilient spring tabs mounted on said container adjacent the ends of said slit to permit engagement of a disposable bag thereunder as it is being pulled from said container.

11. Structure according to claim 10 and including a scoop projecting from one end of said container.

12. Structure according to claim 11 wherein said removable endcap defines a projecting utility scoop.

13. Structure according to claim 10 wherein said at least one strap comprises two straps spaced along said container and including a third elongated flexible restraint mounted on said endcap to engage a loop of a pet leash.

* * * * *